United States Patent Office 3,525,739
Patented Aug. 25, 1970

3,525,739
LOWER ALKOXYTETRAHYDROPYRANYL ETHERS OF CORTICOID STEROIDS
Alexander D. Cross, Mexico City, Mexico, and John A. Edwards, Los Altos, Calif., assignors to Syntex Corporation, Panama, Panama, a corporation of Panama
No Drawing. Filed May 22, 1968, Ser. No. 731,299
Int. Cl. C07c *173/00*
U.S. Cl. 260—239.55
17 Claims

ABSTRACT OF THE DISCLOSURE

The 4' - (lower)alkoxytetrahydropyran-4'-yl ethers of corticoids have high oral activities.

---

This invention relates to novel and useful 4'-(lower) alkoxytetrahydropyran-4'-yl ethers of corticoid steroids, the steroid nucleus thus bearing a new group represented by the formula:

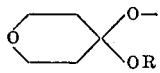

wherein —OR is a (lower) primary or secondary alkoxy group at the C–21 position of the steroid nucleus.

The preferred corticoid steroid ethers of this invention can be represented by the formulas:

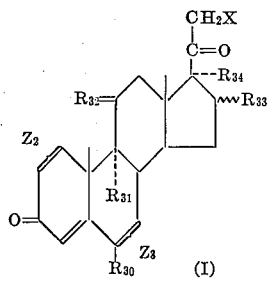

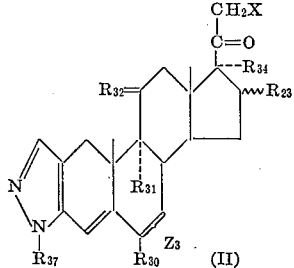

wherein
$R_{30}$ is hydrogen, methyl, fluoro, or chloro and when $Z_3$ is a single bond, $R_{30}$ can be either $\alpha$ or $\beta$ oriented;
$R_{31}$ is hydrogen, chloro, or fluoro;
$R_{32}$ is keto or

wherein $R'_{32}$ is hydroxy, chloro, or fluoro;
$R_{33}$ is hydrogen, methyl, hydroxy, or conventional hydrolyzable esters thereof;
$R_{34}$ is hydrogen, hydroxy, conventional hydrolyzable esters thereof, or when taken together with $R_{33}$,

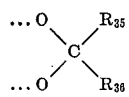

$R_{35}$ is hydrogen or alkyl of up to eight carbons;
$R_{36}$ is hydrogen, alkyl, or an aryl group of up to eight carbons;

$R_{37}$ is hydrogen, methyl, phenyl, chlorophenyl, fluorophenyl, methylphenyl, or methoxyphenyl (the substituted phenyls preferably being substituted in the para position);
$R_{67}$ and $R_{68}$ each is hydrogen, chloro, or fluoro;
X is 4' - (lower)alkoxytetrahydropyran-4'-yloxy; and
$Z_2$ and $Z_3$ each is a single bond, double bond, or

The preferred corticoids of this invention have the 4'-(lower)alkoxytetrahydropyran-4'-yloxy group at position C–21 of the steroid nucleus.

The terms "(lower)alkyl" and derivations thereof appearing in the above definitions and elsewhere in the instant specifications denote alkyl groups containing from one to six carbon atoms, inclusive, such as methyl, ethyl, propyl, isopropyl, butyl, isobutyl, t-butyl pentyl, amyl, hexyl, and the like.

The term "conventional hydrolyzable ester" as used herein denotes those hydrolyzable ester groups conventionally employed in the steroid art, preferably, those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t - butylacetate, trimethylhexanoate, methylneopentylacetate, cyclohexylacetate, cyclopentylpropionate, adamantoate, glycolate, methoxyacetate, hemisuccinate, hemiadipate, hemi - $\beta$, $\beta$-dimethylglutarate, acetoxyacetate, 2-chloro - 4 - nitrobenzoate, aminoacetate, diethylaminoacetate, piperidinoacetate, $\beta$-chloropropionate, trichloroacetate, $\beta$-chlorobutyrate, dihydrogen phosphate, dibenzyl phosphate, benzyl hydrogen phosphate, sodium benzene phosphate, cyclohexylammonium benzyl phosphate, sodium phenyl phosphate, sodium ethyl phosphate, di - p - nitrobenzyl phosphate, sodium o-methoxyphenyl phosphate, cyclohexylammonium p - cyanobenzyl phosphate, sodium phenacyl phosphate, henzyl o-carbomethoxyphenyl phosphate, and the like.

By the term "aryl" are included aryl, aralkyl, and alkaryl groups, such as phenyl, p-chlorophenyl, p-methoxyphenyl, benzyl, phenethyl, tolyl, ethylphenyl, and the like. The wavy line ($\int$) designates and includes both the alpha and beta configurations.

The compounds represented by Formulas I and II have corticoid activity and are accordingly useful as antiinflammatory agents. They are useful in the same manner for the same purposes as hydrocortisone. These compounds are administered by the usual routes, whether orally, parenterally, or topically, either singly, in conjunction with other medicinal agents, or in pharmaceutically acceptable non-toxic compositions formed by the incorporation of any of the normally employed excipients.

The novel 21 - (4' - lower alkoxytetrahydropyran-4'-yloxy)ethers of Formulas I and II can be prepared from the corresponding 21-hydroxy compounds represented by Formulas I' and II':

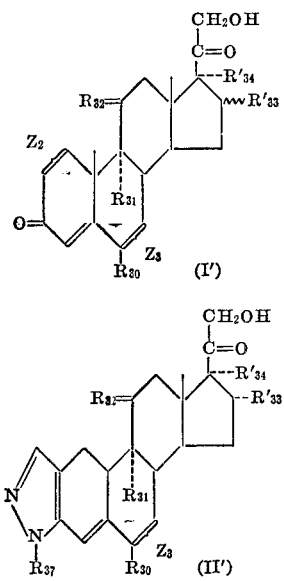

wherein $R_{30}$, $R_{31}$, $R_{32}$, $R_{37}$, $Z_2$, and $Z_3$ have the meanings indicated with respect to Formula XXV;

$R'_{33}$ is hydrogen, methyl, or a hydrolyzable ester of a 16α- or 16β-hydroxy group; and $R'_{34}$ is hydrogen, hydroxy, a conventional hydrolyzable ester thereof, or in conjunction with $R'_{33}$,

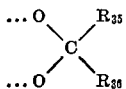

wherein $R_{35}$ and $R_{36}$ have the meanings indicated above with respect to Formulas I and II.

The corticoid ethers of Formulas I and II are prepared from the starting materials represented by Formulas I' and II' by reacting the latter compounds under substantially anhydrous conditions with an excess of 4'-(lower)-alkoxy-5',6'-dihydro-2H-pyran; for example with from about two to about 50 or more molecular equivalents for each hydroxyl group to be etherified in the steroid starting material, in the presence of a small amount of an acidic catalyst, such as hydrochloric acid, p-toluenesulfonic acid, boron trifluoride etherate, and the like, either alone or together with an inert, organic solvent, such as benzene, diethyl ether, or the like, at a temperature ranging from about 0° C. to about 80° C. (preferably at around room temperature, i.e. 25° C.) for about five minutes to about 48 hours, thus giving the corresponding 21-(4'-lower-alkoxytetrahydropyran-4'-yloxy) ethers represented by Formulas I and II.

Prior to the above reaction, protection should be provided for readily etherified hydroxyl groups other than the C-21 hydroxyl groups, e.g. 16α-hydroxy group. Such a group should be selectively acylated such as by reaction with acetic anhydride in pyridine, the quantity of acetic anhydride being sufficient to acylate both the C-16 and C-21 hydroxyl groups. Hydrolysis of the diacetate in methanol with less than one molar equivalent of sodium carbonate in water yields the 16-acetoxy-21-hydroxy product which can be separated by conventional chromatography on neutral alumina, for example. After the above etherification, the acetoxy protecting groups can be removed by treatment of the ester in a methanol solution of potassium hydroxide.

The 4'-(lower)alkoxy-5',6'-dihydro-2H-pyran reactants used to form the ethers of this invention can be prepared by well-known methods. For example, tetrahydro-4'-pyrone can be reacted with a primary or secondary lower alkanol under acidic conditions to form the intermediate, 4',4'-di(lower)alkoxytetrahydropyran, which upon distillation with an acid such as toluenesulfonic acid or mesitylenesulfonic acid, yields the 4'-(lower)alkoxy-5',6'-dihydro-2H-pyran product. Such a method is described by Reese et al., J. Am. Chem. Soc. 89, 3367 (1967). The lower alkanol is preferably methanol but it can be other lower alcohols, such as ethanol, propanol, isopropanol, butanol, isobutanol, pentanol, amyl alcohol, hexanol, and the like, to form the corresponding pyrans, such as, for example, 4'-methoxy-5',6'-dihydro-2H-pyran, 4' - ethoxy-5',6'-dihydro-2H-pyran, etc.

The starting materials represented by Formulas I' and II' are known in the art or can be obtained by conventional procedures from known materials. See, for example, U.S. Pats. 3,365,446, 3,067,194, and 3,364,203, the entire disclosures thereof being incorporated herein by reference.

In preparing the ethers of Formulas I and II, the substituents represented by $R_{30}$ are preferably present in the starting steroids although the 6-halo groups can be introduced by converting the 3-keto-4-ene to its enol ether, such as by treatment with ethyl orthoformate and treating the thus prepared enol ether intermediate with N-chlorosuccinimide or perchloryl fluoride, respectively, yielding the 3-keto-4,6-diene containing a 6-chloro or 6-fluoro group.

The substituents represented by $R_{33}$ and $R_{34}$ are likewise present in the starting steroid. The 16α,17α-acetals and -ketals are prepared upon treatment of a 16α, 17α-dihydroxy compound with an aldehyde or ketone in the presence of an acid, such as perchloric acid.

The substituents represented by $R_{31}$ and $R_{32}$ may be present in the starting steroid or may be sequentially introduced using conventional procedures. Thus, an 11β-hydroxy compound is dehydrogenated to yield a 9(11)-ene. This compound is converted to the 9β, 11β-oxido derivative, then to the bromohydrin intermediate. Treatment of the oxido compound with hydrogen fluoride or hydrogen chloride then yields the 9α-fluoro-11β-hydroxy or 9α-chloro-11β-hydroxy compounds. Alternatively, the 9(11)-ene is treated with chlorine to yield the 9α,11β-chloro derivative.

The conjugated unsaturated system wherein $Z_2$ and/or $Z_3$ is a double bond is introduced as follows. By treating a 3-keto-4-ene with 2,3-dichloro-5',6'-dicyano-1,4-benzoquinone in, for example, dioxane solvent, the corresponding 3-keto-1,4-diene is prepared. Treatment of the 3-keto-4-ene with chloranil in ethylacetate and in the presence of acetic acid, the corresponding 3-keto-4,6-diene is prechloranil in n-amyl alcohol affords the corresponding 3-keto-1,4,6-triene compound.

Introduction of the halomethylene group at either of positions C-1,2 and/or C-6,7 involves treatment of the conjugated unsaturated steroid with a molar excess of an alkali or alkaline earth metal salt of a haloacetic acid, such as bromodichloroacetic acid, trichloroacetic acid, dichlorofluoroacetic acid, difluorochloroacetic acid, and the like. Use of the trihalo acid introduces the dihalomethylene group while a dihalo acid provides the monohalomethylene group.

It is preferable to conduct this latter reaction after certain labile substituents, such as hydroxy groups, have been protected, for example, by converting them to esters, tetrahydropyran ethers, or ketones which groups readily facilitate the regeneration of the hydroxyl group. This preference is not absolutely necessary, however, since a hydroxyl group which might become involved in side reactions can be regenerated upon execution of a mild hydrolysis.

The C-1,2 and/or C-6,7 fused methylene group is introduced by reaction of the conjugated unsaturated steroid with dimethylsulfonium methylide base in dimethylsulfoxide. Alternatively, this group can be provided by reductive dehalogenation with suitable protection of the C-17α, C-20, and C-21 oxygen functions, such as with lithium aluminum hydride, of a halomethylene group, introduced as described above. When the compound has a hydroxyl group at C–17α, the starting material can be reacted with formaldehyde in a chloroform solution containing hydrochloric acid to form the 17α,20,21-bismethylenedioxy group which after the above reduction can be cleaved with an aqueous acetic acid solution, a technique which is known in the art. If C–17α has a hydrogen group, the 20-keto group can be converted to an ethylenedioxy group using ethylene glycol in a benzene solution containing p-toluenesulfonic acid. Cleavage of the protecting group after the above reduction is obtained with p-toluenesulfonic aicd in ethanol.

These groups can be inserted in 3-keto-1,4-dienes to give the C–1,2 adduct or a 3-keto-4,6-diene to give the C–6,7 adduct. The bis-substituted derivatives are preferably prepared by first introducing the desired group at C–1,2 and thereafter generating the 4,6-diene system and introducing the desired group at C–6,7.

The halomethylene and methylene groups so inserted have the orientation of the resultant fused grouping including both isomeric alpha and beta configuration in variable ratios. Each isomer can be separated and removed using conventional techniques, such as chromatography, fractional recrystallization, and the like, by virtue of their different physical properties. Although in some instances, one particular configurational isomer may predominate in the reaction mixture, it will be understood that each, whether specifically mentioned or not, is included within the scope of the present invention.

The [3,2-c] pyrazole group of Formula II' can be obtained by reacting the 3-keto compound with ethylformate and sodium hydride to form the corresponding 2-hydroxymethylene compound. Reacting the latter compound with a hydrazine of the Formula $NH_2NHR_{37}$, $R_{37}$ being as previously defined, under an inert atmosphere, such as nitrogen, and at elevated temperatures such as the reflux temperature of ethanol yields the 4-pregneno [3,2-c] pyrazole products II'.

In reacting the starting materials of Formulas (I') and (II') with 4'-(lower)-alkoxy-5',6'-dihydro-2H-pyran by the herein-described procedures to form 4'-(lower) alkoxytetrahydropyran-4'-yl ethers of this invention, a second series of ethers, that is, 5',6'-dihydro-2H-pyran-4'-yl ethers of the starting materials are also formed. This second series of ethers correspond to those represented by Fomulas (I) and (II) wheerin X is the 5',6'-dihydro-2H-pyran-4'-yloxy group. Hydrocarbon solvents for the reaction medium, higher catalyst concentrations, sented by Formulas (I) and (II) wherein X is the 5',6'-dihydro-2H-pyran-4'-yloxy compounds; use of ether or tetrahydrofuran solvents, lower catalyst concentrations, and shorter reaction times increase the yield of the 4'-(lower)alkoxytetrahydrofuran-4'-yloxy compounds. This second series of compounds can be separated from the reaction products by conventional chromatographic techniques.

These 5',6'-dihydro-2H-pyran-4'-yl ethers have corticoid activity and are accordingly useful as anti-inflammatory agents. They are useful in the same manner and for the same purposes as hydrocortisone, and can be administered by the usual routes, whether orally, parenterally, or topically, either singly, in conjunction with other medicinal agents, or in pharmaceutically acceptable, non-toxic compositions formed by the incorporation of any of the normally employed excipients.

Examples of suitable 5',6'-dihydro-2H-pyran-4'-yl ethers are:

21-(5',6'-dihydro-2H-pyran-4'-yloxy)pregna-1,4-diene-11β,17α-diol-3,20-dione,
6α,9α-difluoro-16α,17α-isopropylidenedioxy-21-(5',6'-dihydro-2H-pyran-4'-yloxy)pregna-1,4-dien-11β-ol-3,20-dione,
6α-fluoro-16α,17α-isopropylidenedioxy-21-(5',6'-dihydro-2H-pyran-4'-yloxy)pregna-1,4-dien-11β-ol-3,20-dione,
9α-fluoro-16α,17α-isopropylidenedioxy-21-(5',6'-dihydro-2H-pyran-4'-yloxy)pregna-1,4-dien-11β-ol-3,20-dione,
6α-fluoro-9α,11β-dichloro-16α,17α-isopropylidenedioxy-21-(5',6'-dihydro-2H-pyran-4'-yloxy)pregna-1,4-diene-3,20-dione,
6α,9α-difluoro-16α,17α-isopropylidenedioxy-21-(5',6'-dihydro-2H-pyran-4'-yloxy)pregn-4-en-11β-ol-3,20-dione,
6α-fluoro-16α,17α-isopropylidenedioxy-21-(5',6'-dihydro-2H-pyran-4'-yloxy)pregn-4-en-11β-ol-3,20-dione,
6α,9α-difluoro-16α-methyl-17α-valeroxy-21-(5',6'-dihydro-2H-pyran-4'-yloxy)pregna-1,4-dien-11β-ol-3,20-dione,
9α-fluoro-16β-methyl-17α-valeroxy-21-(5',6'-dihydro-2H-pyran-4'-yloxy)pregna-1,4-dien-11β-ol-3,20-dione,
6α-fluoro-16β-methyl-17α-valeroxy-21-(5',6'-dihydro-2H-pyran-4'-yloxy)pregna-1,4-dien-11β-ol-3,20-dione,
6α,9α-difluoro-16α-methyl-21-(5',6'-dihydro-2H-pyran-4'-yloxy)pregna-1,4-diene-11β,17α-diol-3,20-dione,
6α-fluoro-16α-methyl-21-(5',6'-dihydro-2H-pyran-4'-yloxy)pregna-1,4-diene-11β,17α-diol-3,20-dione,
9α-fluoro-16α-methyl-21-(5',6'-dihydro-2H-pyran-4'-yloxy)pregna-1,4-diene-11β,17α-diol-3,20-dione,
6α,7α-difluoromethylene-21-(5',6'-dihydro-2H-pyran-4'-yloxy)pregn-4-ene-11β,17α-diol-3,20-dione,
6α-methyl-21-(5',6'-dihydro-2H-pyran-4'-yloxy)pregna-1,4-diene-11β,17α-diol-3,20-dione,
6α-fluoro-16α-methyl-21-(5',6'-dihydro-2H-pyran-4'-yloxy)pregna-1,4-dien-11β-ol-3,20-dione, and the like.

This invention is further illustrated by the following specific but non-limiting examples.

EXAMPLE 1

Two cubic centimeters of 4'-methoxy-5',6'-dihydro-2H-pyran in added to a solution of 1 g. of pregn-4-en-21-ol-3,20-dione and 25 cc. of benzene. Approximately 5 cc. of the mixture is removed by distillation to remove moisture, and the remaining mixture is then cooled to room temperature. To the cooled mixture is then added 0.1 g. of p-toluenesulfonic acid, and the resulting reaction mixture is held at room temperature for four days. The reaction mixture is then washed with an aqueous 5% sodium carbonate solution and then with water until a neutral pH is obtained. It is then dried over anhydrous sodium sulfate and evaporated to dryness. The dry residue is then chromatographed by passing it, dissolved in hexane, through a column of neutral alumina, thus giving 21-(4'-methoxytetrahydropyran - 4' - yloxy)pregn-4-ene-3,20-dione.

Substituting a respective 4'-(lower)alkoxy-5',6'-dihydro-2H-pyran for the 4'-methoxy-5',6'-dihydro-2H- pyran above, the corresponding 21-(4'-ethoxytetrahydropyran-4'-yloxy), 21-(4'-propoxytetrahydropyran - 4' - yloxy), 21-(4'-isopropoxytetrahydropyran-4'-yloxy), 21-(4'-butoxytetrahydropyran-4'-yloxy), 21 - (4'-isobutoxytetrahydropyran-4'-yloxy), 21-(4'-amyloxytetrahydropyran-4'-yloxy), and 21-(4'-hexoxytetrahydropyran-4'-yloxy) corticoids are obtained.

EXAMPLE 2

Repeating the procedure of Example 1 but replacing pregn-4-en-21-ol-3,20-dione with:
pregna-1,4-diene-11β,17α,21-triol-3,20-dione,
6α,9α-difluoro-16α,17α-isopropylidenedioxypregna-1,4-diene-11β,21-diol-3,20-dione,
6α-fluoro-16α,17α-isopropylidenedioxypregna-1,4-diene-11β,21-diol-3,20-dione,
9α-fluoro-16α,17α-isopropylidenedioxypregna-1,4-diene-11β,21-diol-3,20-dione,
6α-fluoro-9α,11β-dichloro-16α,17α-isopropylidenedioxypregna-1,4-dien-21-ol-3,20-dione,
6α-chloro-16α,17α-isopropylidenedioxypregna-1,4-diene-11β,21-diol-3,20-dione,
6α,9α-difluoro-16α,17α-isopropylidenedioxypregn-4-ene-11β,21-diol-3,20-dione, 6α-fluoro-16α,17α-iospropylidenedioxypregn-4-ene-11β,21-diol-3,20-dione,
9α-fluoro-16α,17α-isopropylidenedioxypregn-4-ene-11β,21-diol-3,20-dione,
6α,9α-difluoro-16β-methyl-17α-valeroxypregna-1,4-diene-11β,21-diol-3,20-dione,
6α-fluoro-16β-methyl-17α-valeroxypregna-1,4-diene-11β,21-diol-3,20-dione,
9α-fluoro-16β-methyl-17α-valeroxypregna-1,4-diene-11β,21-diol-3,20-dione,
6α,9α-difluoro-16α-methylpregna-1,4-diene-11β,17α,21-triol-3,20-dione,
6α-fluoro-16α-methylpregna-1,4-diene-11β-17α,21-triol-3,20-dione,
9α-fluoro-16α-methylpregna-1,4-diene-11β,17α,21-triol-3,20-dione,
6α,7α-difluoromethylenepregn-4-ene-11β,17α,21-triol-3,20-dione,
6α,7α-methylenepregn-4-ene-11β,17α,21-triol-3,20-dione,
6α-methylpregna-1,4-diene-11β,17α,21-triol-3,20-dione,
6α,9α-difluoropregna-1,4,6-triene-11β,17α,21-triol-3,20-dione,
6α,9α-difluoro-16α,17α-isopropylidenedioxypregna-1,4,6-triene-11β,21-diol-3,20-dione,
6α-fluoro-16α-methylpregna-1,4-diene-11β,21-diol-3,20-dione,
16α-acetoxypregn-4-ene-11β,21-diol-3,20-dione, and
16β-acetoxypregn-4-ene-11β,21-diol-3,20-dione,
the following 21-ethers are formed:

21-(4'-methoxytetrahydropyran-4'-yloxy)pregna-1,4-diene-11β,17α-diol-3,20-dione,
6α,9α - difluoro - 16α,17α - isopropylidenedioxy - 21 - (4'-methoxytetrahydropyran - 4' - yloxy)pregna - 1,4 - dien-11β-ol-3,20-dione,
6α - fluoro - 16α,17α - isopropylidenedioxy - 21 - (4'-methoxytetrahydropyran - 4' - yloxy)pregn - 1,4 - dien-11β-ol-3,20-dione,
9α - fluoro - 16α,17α - isopropylidenedioxy - 21 - (4'-methoxytetrahydropyran - 4' - yloxy)pregna - 1,4 - dien-11β-ol-3,20-dione,
6α - fluoro - 9α,11β - dichloro - 16α,17α - isopropylidenedioxy - 21 - (4' - methoxytetrahydropyran - 4' - yloxy)pregna-1,4-diene-3,20-dione,
6α - chloro - 16α,17α - isopropylidenedioxy - 21 - (4'-methoxytetrahydropyran - 4' - yloxy)pregna - 1,4 - dien-11β-ol-3,20-dione,
6α - fluoro - 9α,11β - dichloro - 16α,17α - isopropylidene-methoxytetrahydropyran - 4' - yloxy)pregn - 4 - en-11β-ol-3,20-dione,
6α - fluoro - 16α,17α - isopropylidenedioxy - 21 - (4'-methoxytetrahydropyran - 4' - yloxy)pregn - 4 - en-11β-ol-3,20-dione,
9α - fluoro - 16α,17α - isopropylidenedioxy - 21 - (4'-methoxytetrahydropyran - 4' - yloxy)pregn - 4 - en-11β-ol-3,20-dione,
6α,9α - difluoro - 16β - methyl - 17α - valeroxy - 21 - (4'-methoxytetrahydropyran - 4' - yloxy)pregna - 1,4 - dien-11β-ol-3,20-dione,
9α - fluoro - 16β - methyl - 17α - valeroxy - 21 - (4'-methoxytetrahydropyran - 4' - yloxy)pregna - 1,4 - dien-11β-ol-3,20-dione,
6α - fluoro - 16β - methyl - 17α - valeroxy - 21 - (4'-methoxytetrahydropyran - 4' - yloxy)pregna - 1,4 - dien-11β-ol-3,20-dione,
6α,9α - difluoro - 16α - methyl - 21 - (4' - methoxytetrahydropyran - 4' - yloxy)pregna - 1,4 - diene - 11β,17α-diol-3,20-dione,
6α - fluoro - 16α - methyl - 21 - (4' - methoxytetrahydropyran - 4' - yloxy)pregna - 1,4 - diene - 11β,17α - diol-3,20-dione,
9α-fluoro-16α-methyl-21-(4'-methoxytetrahydropyran-4'-yloxy)pregna-1,4-diene-11β,17α-diol-3,20-dione,
6α,7α-difluoromethylene-21-(4'-methoxytetrahydropyran-4'-yloxy)pregn-4-ene-11β,17α-diol-3,20-dione,
6-methyl-21-(4'-methoxytetrahydropyran-4'-yloxy)-pregna-1,4-diene-11β,17α-diol-3,20-dione,
6α,9α-difluoro-21-(4'-methoxytetrahydropyran-4'-yloxy)pregna-1,4,6-triene-11β,17α-diol-3,20-dione,
6-methyl-21-(4'-methoxytetrahydropyran-4'-yloxy)-pregna-1,4,6-triene-11β,17α-diol-3,20-dione,
6α,9α-difluoro-16α,17α-isopropylidenedioxy-21-(4'-methoxytetrahydropyran-4'-yloxy)pregna-1,4,6-trien-11β,17β-ol-3,20-dione,
6α-fluoro-16α-methyl-21-(4'-methoxytetrahydropyran-4'-yloxy)pregna-1,4-dien-11β-ol-3,20-dione,
16α-acetoxy-21-(4'-methoxytetrahydropyran-4'-yloxy)pregna-4-en-11β-ol-3,20-dione, and
16β-acetoxy-21-(4'-methoxytetrahydropyran-4'-yloxy)pregn-4-en-11β-ol-3,20-dione.

Similarly, corresponding other 4'-(lower)alkoxy-tetrahydropyran-4'-yloxy corticoids are produced by replacing, in the above procedure of this example, the 4'-methoxy-5'-6'-dihydro-2H-pyran with the alternative dihydro-2H-pyrans listed in Example I, last paragraph.

EXAMPLE 3

Repeating the procedure of Example 1 with other pregn-4-en-21-ol-3,20-diones and 4-enol[3,2-c]pyrazolepregnen-21-ol-20-ones having at position C–6, hydrogen, methyl, fluoro, or chloro; at position C–9a, hydrogen, fluoro, or chloro; at position C–11β, chloro or hydroxy; at position C–16, hydrogen, methyl, hydroxy, or conventional hydrolyzable esters thereof; at position C–17a, hydrogen, hydroxy, conventional hydrolyzable esters thereof, or in conjunction with C–16α, methylenedioxy, isopropylidenedioxy, methylphenylmethylenedioxy, ethylphenylmethylenedioxy, or methylacetoxymethylenedioxy; and at each of positions $C_1$–$C_2$ and $C_6$–$C_7$, a single bond, double bond, or methylene, methylmethylene, dimethylmethylene, dichloromethylene, chloromethylene, difluoromethylene, chlorofluoromethylene, methylchloromethylene, methylfluoromethylene, or fluoromethylene group at position C–2; hydrogen, methyl, phenyl, 4''-chlorophenyl, 4''-fluorophenyl, 4''-methylphenyl, or 4''-methoxyphenyl—the respective 21-(4'-loweralkoxytetrahydropyran-4'-yloxy pregn-4-ene-3,20-diones and
4-enol[3,2-c]pyrazole-21-(4'-loweralkoxytetrahydropyran-4'-yloxy)-pregn-20-ones are obtained, e.g.,
9α-chloro-11β-hydroxy-21-(4'-methoxytetrahydropyran-4'-yloxy)pregna-4,6-diene-3,20-dione,
1α,2α-methylene-9α-fluoro-17α-acetoxy-21-(4'-methoxytetrahydropyran-4'-yloxy)pregna-4,6-diene-3,20-dione,
1α,2α-fluoromethylene-6α-methyl-16α,17α-methylphenylmethylenedioxy-21-(4'-methoxytetrahydropyran-4'-yloxy)pregn-4-ene-3,20-dione,
6,16α-dimethyl-21-(4'-methoxytetrahydropyran-4'-yloxy)pregna-4,6-diene-3,20-dione,
6,7-(2'',2''-difluorocyclopropenyl)-21-(4'-methoxytetrahydropyran-4'-yloxy)pregn-4-en-11β-ol-3,20-dione,
4-enol[3,2-c]-2'-(4''-fluorophenyl)pyrazole-6α,9α-difluoro-16α-methyl-21-(4'-methoxytetrahydropyran-4'-yloxy)-pregna-11β,17α-diol-20-one,
4-enol[3,2-c]-2-(4''-fluorophenyl)pyrazole-6,16α-dimethyl-9α-fluoro-21-(4'-methoxytetrahydropyran-4'-yloxy)pregn-6-ene-11β,17α-diol-20-one,
4-enol[3,2-c]-2'-(4''-fluorophenyl)pyrazole-9α-fluoro-16α-methyl-21-(4'-methoxytetrahydropyran-4'-yloxy)pregna-11β,17α-diol-20-one,
4-enol[3,2-c]-2'-(4''-fluorophenyl)pyrazole-6α,9α-fluoro-16α,17α-isopropylidenedioxy-21-(4'-methoxytetrahydropyran-4'-yloxy)pregn-11β-ol-20-one,
4-enol[3,2-c]-2'-(4''-fluorophenyl)pyrazole-6α,7α-difluoromethylene-16α-methyl-21-(4'-methoxytetrahydropyran-4'-yloxy)pregna-11β,17α-diol-20-one, 4-enol[3,2-c]-2'-phenylpyrazole-6α-methyl-21-(4'-methoxytetrahydropyran-4'-yloxy)pregna-11β,17α-diol-20-one, and the like.

The invention claimed is:

1. A 4' - (lower)alkoxytetrahydropyran-4'-yl steroid ether selected from the group consisting of 21-(4'-loweralkoxytetrahydropyran - 4' - yloxy)pregn-4-ene-3,20-diones and 4-enol[3,2-c]pyrazole-21-(4'-loweralkoxytetrahydropyran-4'-yloxy)pregn-20-ones having at position C–6, a member selected from the group consisting of hydrogen, methyl, fluoro, and chloro; at position C–9α, a member selected from the group consisting of hydrogen, fluoro, and chloro; at position C–11, a member selected from the group consisting of keto, β-chloro, β-fluoro, and β-hydroxy; at position C–16, a member selected from the group consisting of hydrogen, methyl, hydroxy, and conventional hydrolyzable esters thereof; at position C–17α, a member selected from the group consisting of hydrogen, hydroxy, conventional hydrolyzable esters thereof, and in conjunction with C–16α, a group having the general formula:

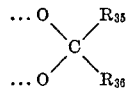

wherein $R_{35}$ is selected from the group consisting of hydrogen and alkyl having up to eight carbons and $R_{36}$ is selected from the group consisting of hydrogen, alkyl, and aryl, the latter two groups having up to eight carbons; having at each of positions $C_1-C_2$ and $C_6-C_7$, a member selected from the group consisting of a single bond, double bond, or groups having the general formula

wherein $R_{67}$ and $R_{68}$ each is selected from the group consisting of hydrogen, chloro, and fluoro; and having at position C–2″, a member selected from the group consisting of hydrogen, methyl, phenyl, chlorophenyl, fluorophenyl, methylphenyl, and methoxyphenyl.

2. The steroid ether of claim 1 wherein the ether is 21-(4'-methoxytetrahydropyran - 4' - yloxy)pregna-1,4-diene-11β,17α-diol-3,20-dione.

3. The steroid ether of claim 1 wherein the ether is 6α,9α-difluoro-16α,17α-isopropylidenedioxy - 21 - (4'-methoxytetrahydropyran - 4' - yloxy)pregna-1,4-dien-11β-ol-3,20-dione.

4. The steroid ether of claim 1 wherein the ether is 6α-fluoro - 16α,17α-isopropylidenedioxy-21-(4'-methoxytetrahydropyran - 4' - yloxy)pregna-1,4-dien-11β-ol-3,20-dione.

5. The steroid ether of claim 1 wherein the ether is 9α-fluoro - 16α,17α-isopropylidenedioxy-21-(4'-methoxytetrahydropyran - 4' - yloxy)pregna-1,4-dien-11β-ol-3,20-dione.

6. The steroid ether of claim 1 wherein the ether is 6α-fluoro - 9α,11β - dichloro-16α,17α-isopropylidenedioxy-21-(4'-methoxytetrahydropyran - 4' - yloxy)pregna-1,4-diene-3,20-dione.

7. The steroid ether of claim 1 wherein the ether is 6α,9α-difluoro - 16α,17α - isopropylidenedioxy-21-(4'-methoxytetrahydropyran - 4' - yloxy)pregn-4-en-11β-ol-3,20-dione.

8. The steroid ether of claim 1 wherein the ether is 6α-fluoro - 16α,17α - isopropylidenedioxy-21-(4'-methoxytetrahydropyran - 4' - yloxy)pregn - 4 - en-11β-ol-3,20-dione.

9. The steroid ether of claim 1 wherein the ether is 6α,9α-difluoro - 16α - methyl-17α-valeroxy-21-(4'-methoxytetrahydropyran - 4' - yloxy)pregna-1,4-dien-11β-ol-3,20-dione.

10. The steroid ether of claim 1 wherein the ether is 9α-fluoro - 16β - methyl-17α-valeroxy-21-(4'-methoxytetrahydropyran - 4' - yloxy)pregna-1,4-dien-11β-ol-3,20-dione.

11. The steroid ether of claim 1 wherein the ether is 6α-fluoro - 16β - methyl-17α-valeroxy-21-(4'-methoxytetrahydropyran - 4' - yloxy)pregna-1,4-dien-11β-ol-3,20-dione.

12. The steroid ether of claim 1 wherein the ether is 6α,9α-difluoro - 16α - methyl-21-(4'-methoxytetrahydropyran - 4' - yloxy)pregna-1,4-diene-11β,17α-diol-3,20-dione.

13. The steroid ether of claim 1 wherein the ether is 6α-fluoro - 16α - methyl-21-(4'-methoxytetrahydropyran-4'-yloxy)pregna-1,4-diene-11β,17α-diol-3,20-dione.

14. The steroid ether of claim 1 wherein the ether is 9α-fluoro - 16α - methyl-21-(4'-methoxytetrahydropyran-4'-yloxy)pregna-1,4-diene-11β,17α-diol-3,20-dione.

15. The steroid ether of claim 1 wherein the ether is 6α,7α-difluoromethylene - 21 - (4'-methoxytetrahydropyran-4'-yloxy)pregn-4-ene-11β,17α-diol-3,20-dione.

16. The steroid ether of claim 1 wherein the ether is 6α-methyl - 21 - (4'-methoxytetrahydropyran-4'-yloxy)pregna-1,4-diene-11β,17α-diol-3,20-dione.

17. The steroid ether of claim 1 wherein the ether is 6α-fluoro - 16α - methyl-21-(4'-methoxytetrahydropyran-4'-yloxy)pregna-1,4-dien-11β-ol-3,20-dione.

References Cited

UNITED STATES PATENTS

| | | | |
|---|---|---|---|
| 3,294,786 | 12/1966 | Cross et al. | 260—239.55 |
| 3,376,291 | 4/1968 | Fried | 260—239.5 |
| 3,777,342 | 4/1968 | Fried | 260—239.55 |

HENRY A. FRENCH, Primary Examiner

U.S. Cl. X.R.

260—239.5, 397.45, 999

UNITED STATES PATENT OFFICE
CERTIFICATE OF CORRECTION

Patent No. 3,525,739              Dated August 25, 1970

Inventor(s) Alexander D. Cross and John A. Edwards

It is certified that error appears in the above-identified patent and that said Letters Patent are hereby corrected as shown below:

Column 2, line 50, "benzene" should read -- benzyl --; and line 55, "henzyl" should read -- benzyl --.

Column 4, line 49, "pre-" should read -- prepared. Similar treatment of the 3-keto-4,6-diene with --.

Column 5, line 47, "wheerin" should read -- wherein --; and line 50, "sented by Formulas (I) and (II) wherein X is" should read -- and longer reaction times increase the yield of --.

Column 7, line 49, "6α-fluoro-9α,11β-dichloro-16α,17α-isopropylidene" should read -- 6α,9α-difluoro-16α,17α-isopropylidenedioxy-21-(4'- --.

Column 8, line 43, "yloxy pregn-" should read -- yloxy)-pregn- --; and line 64, "2-(4" " should read -- 2'-(4" --.

Signed and sealed this 18th day of July 1972.

(SEAL)
Attest:

EDWARD M. FLETCHER, JR.            ROBERT GOTTSCHALK
Attesting Officer                  Commissioner of Patents